United States Patent [19]

Inoue et al.

[11] Patent Number: 4,617,623
[45] Date of Patent: Oct. 14, 1986

[54] CNC PROCESS FOR DISPLACING A MOVABLE MEMBER ALONG A PATH ON A 3D SURFACE

[75] Inventors: Kiyoshi Inoue, Tokyo; Jinzo Yabe, Yokohama, both of Japan

[73] Assignee: Inoue-Japax Research Incorporated, Kanagawa, Japan

[21] Appl. No.: 742,366

[22] Filed: Jun. 7, 1985

Related U.S. Application Data

[63] Continuation of Ser. No. 434,336, Oct. 14, 1982, abandoned.

[30] Foreign Application Priority Data

Oct. 16, 1981 [JP] Japan ................. 56-166159

[51] Int. Cl.$^4$ ........................................... G06F 15/00
[52] U.S. Cl. ................................. 364/167; 364/474; 318/567; 318/570
[58] Field of Search ............ 364/167, 168, 474; 318/567, 569, 570

[56] References Cited

U.S. PATENT DOCUMENTS

| | | | |
|---|---|---|---|
| 3,878,983 | 4/1975 | Hamill, III et al. | 364/169 X |
| 3,970,830 | 7/1976 | White et al. | 364/168 X |
| 4,055,787 | 10/1977 | Beadle et al. | 364/171 X |
| 4,135,239 | 1/1979 | Hamill, III et al. | 364/474 X |
| 4,162,527 | 7/1979 | Kilbane et al. | 364/474 |
| 4,370,720 | 1/1983 | Hyatt | 364/474 |
| 4,445,182 | 4/1984 | Morita et al. | 364/474 |
| 4,507,366 | 3/1985 | Nozawa et al. | 364/474 |

FOREIGN PATENT DOCUMENTS

0077177 7/1982 European Pat. Off. .

OTHER PUBLICATIONS

Progress in Shape Modeling, Dec. 1977, Computer, vol. 10, No. 12, pp. 40-45, by Tony C. Woo, University of Michigan.

*Primary Examiner*—Jerry Smith
*Assistant Examiner*—Allen MacDonald
*Attorney, Agent, or Firm*—Karl F. Ross; Herbert Dubno

[57] ABSTRACT

A CNC process for displacing a movable member along a path on an intricate surface in a three-dimensional coordinate system is disclosed in which the surface is divided into a plurality of elementary characteristic regions each individually definable as one of different geometrical categories such as toroidal, spherical, cylindrical and planar surfaces. The process comprises establishing a general equation for each of these categories and storing the established general equations into a memory unit for a computer. Data required to adapt each of the stored general equations to a corresponding one of the characteristic regions in the three-dimensional coordinate system are inputted into the computer to reduce the general equations to their respective specific equations in which no more than three coordinates are variable. A sequence of incremental two-dimensional positions defined in the system by first and second coordinates thereof are inputted into the computer to allow it to compute, for each position on the path, the value of the third coordinate from the first and second coordinates and the specific equations, thereby determining the path along which the member is moved.

8 Claims, 5 Drawing Figures

CNC PROCESS FOR DISPLACING A MOVABLE MEMBER ALONG A PATH ON A 3D SURFACE

This is a continuation of co-pending application Ser. No. 434,336 filed on Oct. 14, 1982 and now abandoned.

FIELD OF THE INVENTION

The present invention relates generally to numerical control for a machine and, more particularly, to a new and improved numerical-control process for displacing a movable member over on a prescribed intricate surface in a three-dimensional coordinate system. The movable member may be a tool or workpiece in a milling machine, lathe or like conventional machine tool, a working electrode or workpiece in electrical machining such as electrical discharge machining (EDM) or in electrodeposition. The movable member may also be any movable member in other machines such as a robotic hand and the term is intended herein to refer generally to any member to be automatically moved precisely along a path lying on a prescribable but intricate three-dimensional surface.

BACKGROUND OF THE INVENTION

Where the end or active portion of a tool or working electrode is moved automatically under numerical control, it has been common practice to establish from a drawing numerical values corresponding to the successive positions of such a member to be moved. Thus, a required path of movement has been determined from the drawing whereupon the successive positions have been identified thereon. The successive numerical values corresponding to these positions are then recorded on a store medium such as punched tapes, cards or magnetic tapes for reproduction during the actual course of displacement of the member. When the path is drawn on an intricate three-dimensional surface, it is apparent that the number of numerical values or the amount of numerical data may be increased prohibitively and requires a great deal of time for not only the preparation but also the transfer, i.e. recording and reproduction, of the required numerical data.

While a computer has also been used sometimes in conjunction with the conventional NC process, its use has in practice been limited either to the preparation of these numerical values for recording and reproduction or to execute, during the data reproduction stage, a linear or curvilinear interpolation process which does not materially serve to reduce the time and effort required.

In the conventional computation of numerical values of successive positions in conjunction with the NC process, it should also be noted that positions lying on an intersection of two different three-dimensional surfaces have been found to be complex and troublesome to compute. While the use of a computer certainly eased such computations, the computer needed to be large-sized and capable of high-speed operation but success was nevertheless quite limited. Even a high-speed computer, the time required for handling the complete process for many an actual displacement operation has been quite unsatisfactorily long.

OBJECTS OF THE INVENTION

Accordingly, the present invention seeks to provide a novel and improved computerized numerical control (CNC) process for displacing a movable member so as to follow an intricate three-dimensional surface whereby the process efficiency or the efficiency, viz. in terms of time and labour, of determining numerical values for the path of movement of the movable member is markedly enhanced.

A specific object of the invention is to provide a novel and improved CNC process whereby the amount of data to be inputted into the computer is largely reduced.

SUMMARY OF THE INVENTION

In accordance with the present invention there is provided a computerized numerical control process for displacing a member along a path on a predetermined intricate surface in a three-dimensional coordinate system, which process comprises: (a) dividing the intricate surface into a plurality of elementary characteristic regions each individually definable as one of preselected different geometrical categories among curves of first order, curves of second order, surfaces of first order and surfaces of second order and expressable by an equation specific thereto in which no more than three-dimensional coordinates are variable; (b) establishing a general equation for each of the said preselected geometrical categories and storing the established general equations in memory means for a computer; (c) inputting into said computer data required to adapt each of the stored general equations to a corresponding one of said elementary characteristic regions in the predetermined three-dimensional coordinate system, thereby reducing it to said specific equation; (d) establishing a sequence of incremental two-dimensional positions in the three-dimensional coordinate system defined by predetermined first and second coordinates thereof; (e) successively inputting into the computer the coordinates of the sequentially incremental two-dimensional positions to compute, for each position on the path, the value of the third coordinate from said specific solution and the inputted first and second coordinates, thereby determining the path three-dimensionally; and (f) displacing the member along the so determined path.

BRIEF DESCRIPTION OF THE DRAWING

These and other features of the present invention as well as advantages thereof will become more readily apparent from a reading of the following description of certain exemplary embodiments thereof with reference to the accompanying drawings in which.

SPECIFIC DESCRIPTION

Figure 1:
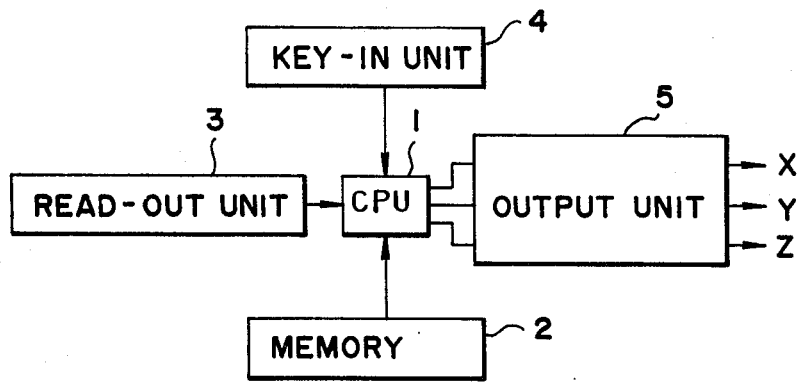
FIG. 1 is a schematic block diagram illustrating a computerized numerical control system for carrying out the process of the invention.

Referring first to FIG. 1 the system includes a computer 1 comprising a central processing unit (CPU)

which has a memory unit 2 comprising a memory medium associated therewith. The memory unit 2 is used here for recording therein general equations relating respectively to various elementary characteristic surface categories into which divisions of an intricate three-dimensional surface to be followed by a movable member during its movement may, when made properly, fall. These categories generally include a line or a curve of first order, one or more curves of second order, a plane or a surface of first order and one or more surfaces of second order such as a sphere, an ellipsoid, a cylinder, a hyperboloid, a paraboloid and a toroid. The curves of second order include a circle, an ellipse, a hyperbola and a parabola.

The computer 1 is further associated with a readout unit 3, a key-in terminal 4 and an output device 5. The readout unit 3 is used to read out and input into the computer 1, various selected data stored on a record medium such as punched tapes or cards or magnetic tapes or dishes. The input data include data for the sequence and manners of computations to be executed by the computer and data for such sequential computations, including a datum required to adapt each of the general equations stored in the memory unit 2 to a corresponding one of the characteristic regions in a predetermined three-dimensional coordinate system, thereby reducing the general equation to the specific equation therein. The key-in terminal 4 is used to give the computer commands for the computations and may also be used to input some of the aforesaid input data and/or programs. The output device 5 is used to convert the numerical values computed by the computer 1 into corresponding drive signals which are distributed into driver circuits for x-axis, y-axis and z-axis motors (not shown) respectively, which are operably coupled with the movable member (not shown). It should be noted that the calculated numerical values determining the path of interest for the movable member may not be used instantaneously in this manner but may be one time stored on a record medium such as punched tapes for subsequent use upon reproduction.

Figure 2:
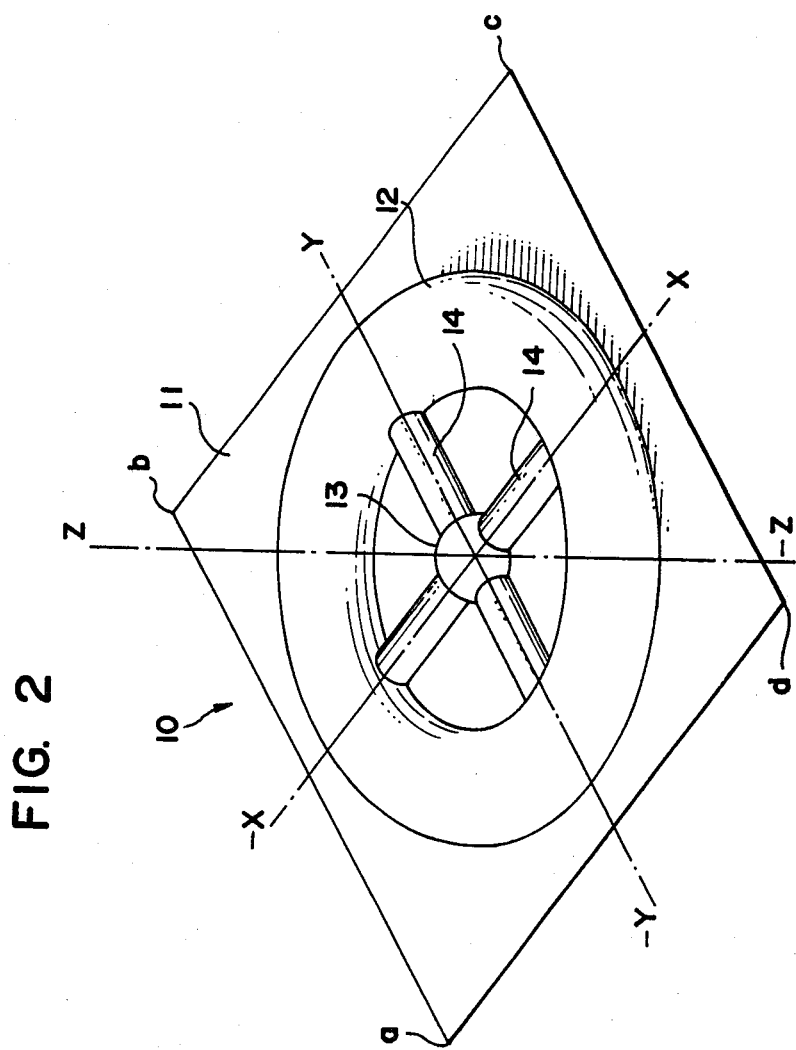
FIG. 2 is a perspective view illustrating an exemplary intricate surface having various characteristic regions and designed to be followed by a movable member according to the invention.

For the purposes of gaining a full understanding of the present invention, reference may be made to FIG. 2 which illustrates a certain three-dimensional surface 10 which is taken as a composite of several characteristic elementary surface categories and which may be produced by electrical machining or milling on a workpiece. The surface 10 is placed in a three-dimensional Cartesian coordinate system (X, Y, Z). It is seen that the surface 10 can be divided into five separate planes 11 which coincide with the X-Y plane, one semi-toroid 12 having its center coinciding with the origin 0 of the system and its surface equally projecting from the X-Y plane, one hemisphere 13 having its center coinciding with the origin 0 and four semi-cylinders 14 having their surfaces equally projection from the X-Y plane and each extending radially from the semi-sphere 13 to the semi-toroid 12 and intersecting each other at right angles.

Figure 3:
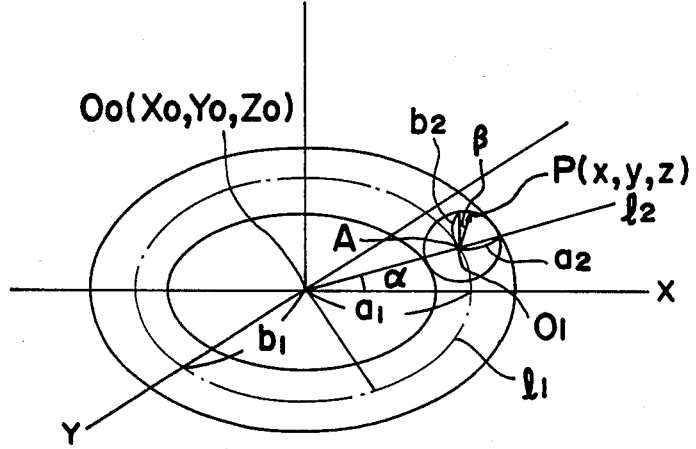
FIG. 3 is a coordinate diagram for explanation of a toroidal surface found as a characteristic region in the intricate surface shown in FIG. 2.

Referring to FIG. 3, it is noted that a point P (x, y, z) on a toroidal surface (12) is expressed as follows:

$$x = (a1 + a2 \cos \beta) \cos \alpha \quad (1)$$

$$y = (a1 + a2 \cos \beta) \sin \alpha \quad (2)$$

$$z = a2 \sin \beta \quad (3)$$

where $a1$ is the radius of the circle $l_1$ about which the toroid is formed, $a_2$ is the radius of the toroid formed about that circle, $\alpha$ is the angle defined by the plane $l_2$ orthogonal to the X-Y plane and containing the point P with the X-axis, and $\beta$ is the angle defined with the Z-axis by the line in the plane $l_2$ and connecting the point P and the circle $l_1$. It is readily apparent that by cancelling $\alpha$ and $\beta$, the expressions (1), (2) and (3) are reduced to the following:

$$(\pm \sqrt{x^2 + y^2} - a1)^2 + z^2 = a2^2 \quad (4)$$

or $$x^2 + y^2 + z^2 = a1^2 + a2^2 \pm 2a1 \sqrt{a2^2 - z^2} \quad (5)$$

Thus, the equation (4) or (5), a general equation for toroidal surface, can be recorded in the memory unit 2 and can be reduced to the equation specific to the particular toroidal surface 12 if parameters $a_1$ and $a_2$ are identified from the drawing. In accordance with the principles of the present invention, the general equation (4) or (5) may be recorded in the memory unit 2. The recorded equation (4) or (5) may be reproduced and inputted into the computer 1 together from data for the parameters $a_1$ and $a_2$ inputted from the readout unit 3 or key-in unit 4 so that the computer 1 calculates the specific equation to the particular toroidal surface 12. The readout unit 3 is used further to input successive positions on the X-Y plane in a desired sequence so that as long as such positions are to lie on the toroidal surface 12, the computer 1 is commanded to calculate the Z-axis coordinates for these two dimensional coordinates according to the specific toroidal equation. The computer 1 is further commanded to select, among all possible solutions (four), one solution which is real and of appropriate sign which is also instructed by the input unit 3.

It will be apparent that in lieu of equation (4) or (5), the set of equations (1), (2) and (3) may be stored in the memory unit 2. Further, instead of equation (4) or (5), or the set of equations (1), (2) and (3), further generalized equations may be used. Thus, the center of the toroid whose equation is to be memorized may not lie on the origin of the X-Y-Z coordinate system. Assuming that the center of the toroid 12 lies at the position Po(xo, yo, zo), it is readily apparent that the equations (1), (2) and (3) can be substituted by the following equations (6), (7) and (8), respectively:

$$x = xo + (a1 + a2 \cos \beta) \cos \alpha \quad (6)$$

$$y = yo + (a1 + a2 \cos \beta) \sin \alpha \quad (7)$$

$$z = zo + a2 \sin \beta \quad (8)$$

Likewise, the equations (4) and (5) can be substituted by:

$$(\pm \sqrt{(x - xo)^2 + (y - yo)^2} - a1^2)^2 + (z - zo)^2 = a2^2 \quad (9)$$

and $$(x - xo)^2 + (y - yo)^2 + (z - zo)^2 = \quad (10)$$

$$a1^2 + a2^2 \pm 2a1 \sqrt{a2^2 - (z - zo)^2}$$

respectively. Nevertheless, the equations (6) to (10) are limited and specific to toroidal surfaces which extend in parallel with the X-Y plane. Thus, it may be desirable that these equations should be further generalized so as to be applicable to toroids which are inclined with any orientation both to the X-Y plane and to the Z-axes, or to all of the X, Y- and Z-axes. It is again readily apparent that the equation (10) can then be generalized as follows:

$$(x - x_o)^2 + (y - Y_o)^2 + (z - z_o)^2 = a1^2 + a2^2 \pm \quad (11)$$

$$2a1 \cdot \sqrt{a2^2 - \{\lambda(x - x_o) + \mu(y - y_o) + \nu(z - z_o)\}^2}$$

where $\lambda$, $\mu$ and $\nu$ are directional cosines, viz. cosines of the line passing the origin O (o, o, o) and perpendicular to the plane of the toroid (the plane containing the circle $l_1$).

Furthermore, the cross section and/or the ring of the toroid may not be circular but may be elliptical with the ring having a longer radius a1 and a shorter radius b1 and the cross section having a longer radius a2 and a shorter radius b2. Then, the equations (6), (7) and (8) can be generalized as follows:

$$x = x_o + \quad (12)$$

$$\left( \frac{a_1 b_1}{\sqrt{a_1^2 \sin^2\alpha + b_1^2 \cos^2\alpha}} + \frac{a_2 b_2}{\sqrt{a_2^2 \sin^2\beta + b_2^2 \cos^2\beta}} \cos\beta \right) \cos\alpha$$

$$y = y_o + \quad (13)$$

$$\left( \frac{a_1 b_1}{\sqrt{a_1^2 \sin^2\alpha + b_1^2 \cos^2\alpha}} + \frac{a_2 b_2}{\sqrt{a_2^2 \sin^2\beta + b_2^2 \cos^2\beta}} \cos\beta \right) \sin\alpha$$

$$z = z_o + \frac{a2 b2}{\sqrt{a_2^2 \sin^2\beta + b_2^2 \cos^2\beta}} \sin\beta \quad (14)$$

Referring to the spherical surface 13, any point P (x, y, z) thereon is expressed by the following equation:

$$(x-x_o)^2+(y-y_o)^2+(z-z_o)^2=R^2 \quad (15)$$

where R is the radius of the sphere or the distance between the center of the sphere $O_o$ ((xo, yo, zo) and the point P (x, y, z). This equation is generalized to represent an ellipsoid as follows:

$$\frac{(x - x_o)^2}{a^2} + \frac{(y - y_o)^2}{b^2} + \frac{(z - z_o)^2}{c^2} = 1 \quad (16)$$

or $$\left. \begin{array}{l} x = a \cos\alpha \cos\beta \\ y = b \sin\alpha \cos\beta \\ z = c \sin\beta \end{array} \right\} \quad (17)$$

where $0<\alpha<2\pi$, $-\pi/2<\beta<\pi/2$.

Referring to any plane given in the three-dimensional space with an inclination to the three coordinate axes expressed by directional cosines ($\lambda$, $\mu$, $\nu$) and the distance between the origin O(o, o, o,) and the plane being l, this plane can be expressed by the following equations:

$$\lambda x + \mu y + \nu z = l \quad (18)$$

For the particular planes 11 in FIG. 2, $\lambda=\mu=0$, $\nu=1$ and $l=0$ and the equation (17) is reduced to:

$$z=0 \quad (19)$$

indicating that the planes 11 coincide with the X-Y plane.

Referring then to semi-cylindrical surfaces 14, any given point P (x, y, z) on each thereof can be expressed as follows:

$$(x-x_o)^2+(y-y_o)^2+(z-z_o)^2-\{\lambda(x-x_o)+\\ \mu(y-y_o)+\nu(z-z_o)\}^2=R^2 \quad (20)$$

where Po (xo, yo, zo) is the center of the circle on one end of the cylinder, R is the radius of this circle and ($\lambda$, $\mu$, $\nu$) are directional cosines of the axis of the cylinder.

A conical surface, though not existent in the example of FIG. 2, can be expressed by the following equation:

$$\{(x-x_o)^2+(y-y_o)^2+(z-z_o)^2\} \cos^2\\ \alpha - \{\lambda(x-x_o)+\mu(y-y_o)+\nu(z-z_o)\}^2 = 0 \quad (21)$$

where Po (xo, yo, zo) is the apex of the cone, $\alpha$ is the angle defined by the cone surface with the axis and ($\lambda$, $\mu$, $\nu$) are directional cosines of the axis of the cone.

A hyperboloid, again not existent in the example of FIG. 2, can be expressed by the following equation:

$$\frac{x^2}{a^2} + \frac{y^2}{b^2} - \frac{z^2}{c^2} = \pm 1 \quad (22)$$

or $$\left. \begin{array}{l} x = a \cos\alpha \cosh\beta \\ y = b \sin\alpha \cosh\beta \\ z = c \sinh\beta \end{array} \right\} \quad (23)$$

A paraboloid can be expressed by the following equation:

$$\frac{x^2}{a^2} + \frac{y^2}{b^2} = 2z \quad (24)$$

A conical surface of second order can be expressed as follows:

$$\frac{x^2}{a^2} + \frac{y^2}{b^2} - \frac{z^2}{c^2} = 0 \quad (25)$$

or $$\left. \begin{array}{l} x = a \beta \cos\alpha \\ y = b \beta \sin\alpha \\ z = \pm c \beta \end{array} \right\} \quad (26)$$

A line passing a given point Po (xo, yo, zo) and with directional ratios (u,v,w) can be expressed by the following equation:

$$\frac{x - x_o}{u} = \frac{y - y_o}{v} = \frac{z - z_o}{w} \quad (27)$$

Among the foregoing general equations for various elementary surface geometries, some may be selected and stored as required, together with required computing programs therefor, into the computer 1. The input units 3 and 4 may be used to adapt the stored general equations to the particular divided characteristic geometries of an actual surface.

Referring to a particular surface 10 shown in FIG. 2, an explanation of certain exemplary computing procedures is given.

PLANE 11

A general equation (18) established and recorded in the memory unit 2 can be adapted to the particular plane 11 shown in FIG. 2 by giving at least three points, for example, three of four corners given thereon. Assuming, that the three points, corners a, b and c, are, for example, located at:

[Xa, Za, Xa] = [−60, −60, 0]

[Xb, Yb, Zb] = [−60, 60, 0]

[Xc, Yc, Zc] = [60, 60, 0]

the equation (18) must satisfy: $\lambda = \mu = 0$, $\nu = 1$ and $l = 0$ and becomes the equation (19). Thus, by being fed with data for the conditions: $\lambda = \mu = 0$, $\nu = 1$ and $l = 0$, the computer 1 can calculate the general equation (18) to yield the equation (19) specific to the plane 11.

TOROIDAL SURFACE 12

A set of general equations (12), (13) and (14), where, for example, [xo, yo, zo, a1, a2, b1, b2] = [0, 0, 0, 40, 10, 40, 10], can be reduced to a set of specific equations:

$$x = (40 + 10 \cos \beta) \cos \alpha \quad (1')$$

$$y = (40 + 10 \cos \beta) \sin \alpha \quad (2')$$

$$z = 10 \sin \beta \quad (3')$$

Thus, by being fed with data for the conditions [xo, yo, zo, a1, a2, b1, b2] = [0, 0, 0, 40, 10, 40, 10], the computer 1 can calculate the equations (12), (13) and (14) to yield the specific equations (1'), (2') and (3'), respectively.

Likewise, the general equation (11) can, because $\lambda = \mu = 0$ and $\nu = 1$, moreover be reduced to the specific equation:

$$x^2 + y^2 + z^2 = 1600 + 100 \pm 80 \sqrt{100 - z^2} \quad (5')$$

SEMI-CYLINDRICAL SURFACE 14

Figure 4:
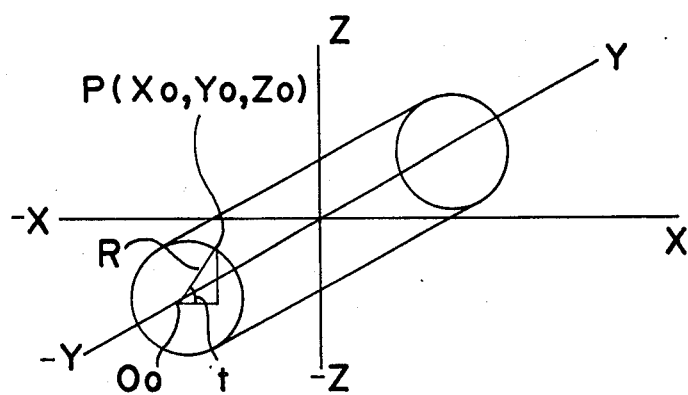
FIG. 4 is a coordinate diagram for explanation of a semi-cylindrical surface found as another characteristic region in the intricate surface shown in FIG. 2.

For each semi-cylinder (see FIG. 4), it is necessary that the coordinates [Xs, Ys, Zs], [Xe, Ye, Ze] of the center of each of the two circular ends and the radius R be given. For example, [Xs, Ys, Zs, R] = [0, −40, 0, 4] and [Xe, Ye, Ze, R] = [0, 40, 0, 4].

HEMISPHERICAL SURFACE 13

Given the coordinates of the center [Xo, Yo, Zo] and the radius R, the general equation (15) is reduced. For example, by being fed with data for [Xo, Yo, Zo, R] = [0, 0, 0, 8], the computer 1 can calculate the general equation (15) to yield the specific equation:

$$x^2 + y^2 + z^2 = 64 \quad (15')$$

SCANNING AND COMPUTATION OF COORDINATES

For determining each position to be traversed by a movable member, the first and second coordinates, say, x and y, are scanned to calculate the third coordinate, z. Thus, for each characteristic region in the surface 10, two limits of coordinate will be given for each of the first and second axes, xo and xn, and yo and yn. The range of x-axis coordinate xn-xo and the range of y-axis coordinate yn-yo can then be equally divided by n and m, respectively so that a prescribed increment $\Delta x$, $\Delta y$ of displacement, say, $1\mu$, $2\mu$, $5\mu$, $10\mu$, $30\mu$. $50\mu$ pr $500\mu$ may be provided equally for each of the x- and y-axes. Each scanning cycle comprises fixing the first of the two coordinates, x, and then scanning the second coordinate y. Thus, the x-coordinate is first fixed at xo (= −60) and the y-coordinate is scanned from yo (= −60) to yn (= 60) incrementally by an increment $\Delta y$. Upon completing this first scanning cycle, the x-coordinate is shifted by $\Delta x$ from xo to x1 (= −60 + $\Delta x$) and the second scanning cycle is followed which again scans the y-coordinate from yo to yn. The cycle is successively repeated until the x-coordinate reaches xn (= 60). For each set of x- and y-coordinate values scanned, the z-coordinate value is calculated from the equation which the region of scanning. Data which applies to specify a particular equation associated with a particular set of x and y coordinates are, of course, inputted into the computer 1. Where the equation has more than one solution, the computer 1 is also programmed to select, among them, a solution which is real and of positive sign as far as the surface of FIG. 2 is concerned in which the z-coordinate value of each point thereon is not less than 0.

Figure 5:
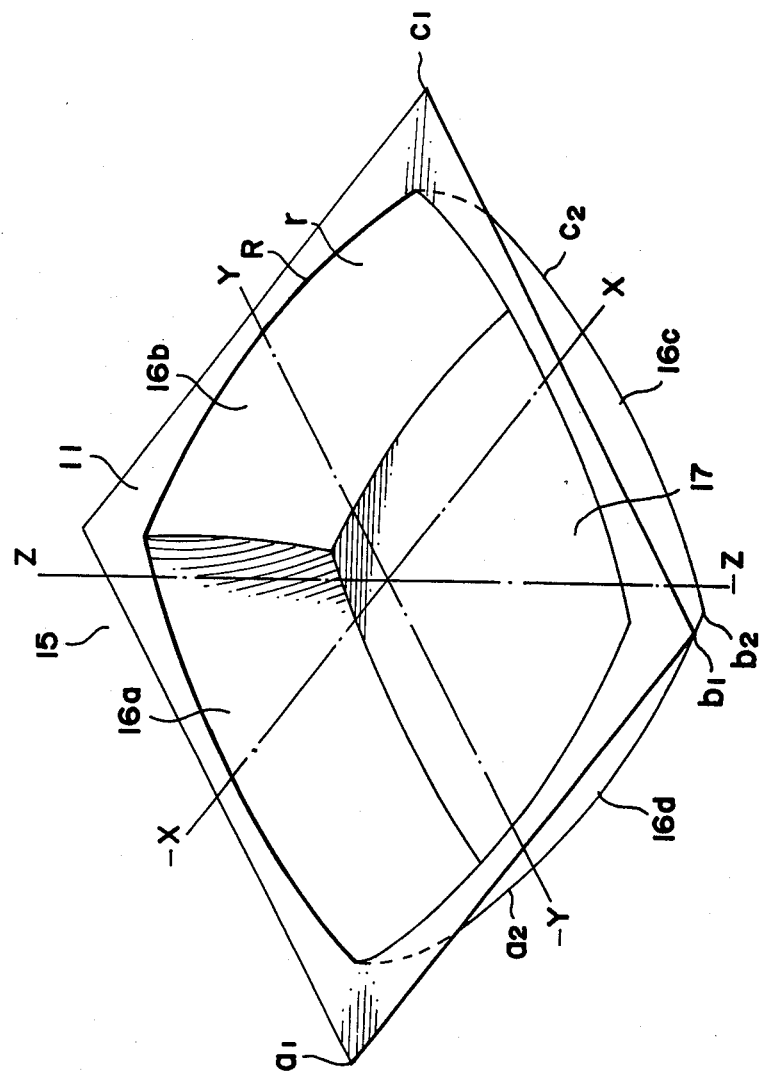
FIG. 5 is a perspective view illustrating another exemplary intricate surface to be followed by a movable member according to be present invention.

FIG. 5 shows another surface 15 which has a plane 11 coinciding with the X-Y plane and an adjoining concave surface, defined by four walls 16a, 16b, 16c and 16d and a floor 17. Each of the walls 16a–16d is defined as a portion of a toroid which has its radius of ring R and its radius of circular cross section r. The general equation for a toroid expressed by the formula (11) is, because $\lambda = \mu = 0$ and $\nu = 1$, here reduced to the formula (10). Input data for further reducing the formula (10) to four equations specific respectively to the surfaces of the walls 16a, 16b, 16c and 16d can be given, for example, as follows: For 16a,

[Xo,Yo,Zo,R,r] = [105,0,0,120,40]

For 16b,

[Xo,Yo,Zo,R,r] = [0,−105,0,120,40]

For 16c,

[Xo,Yo,Zo,R,r] = [−105,0,0,120,40]

For 16d,

[Xo,Yo,Zo,R,r] = [0,105,0,120,40]

For defining the plane 11, the respective coordinates of three points a1, b1 and c1 can be given as follows:

[−60,−60,0]

[60,60,0]

[60,60,0]

Likewise, the floor 17 can be defined by giving the respective coordinates of three points a2, b2 and c2 which may be identified as follows:

[−60,−60,−30]

[60,−60,−30]

[60,60,−30]

respectively.

What is claimed is:

1. A computerized numerical control process for displacing a member along a path on a predetermined intricate surface in a predetermined three-dimensional coordinate system, said process comprising the steps of:
   (a) manually dividing said intricate surface into a plurality of elementary characteristic regions each of which is individually definable as one of preselected different geometrical categories among curves of first order, curves of second order, surfaces of first order for intricate surfaces so divisible and surfaces of second order for intricate surfaces so divisible and is expressable by an equation specific to each such region;
   (b) establishing a general equation for each of said preselected geometrical categories and storing the established general equations in memory means for a computer;
   (c) inputting into said computer data required to adapt each of said stored general equations to a corresponding one of said characteristic regions in said predetermined three-dimensional coordinate system, thereby reducing it to said specific equation;
   (d) establishing a sequence of incremental two-dimensional positions in said three-dimensional coordinate system which positions are defined by predetermined first and second coordinates thereof;
   (e) successively inputting into said computer the coordinates of said sequentially incremental two-dimensional positions to compute, for each incremental position along a path lying on said surface, the value of a third coordinate in said coordinate system from said specific equations and said inputted first and second coordinates, thereby determining said path three-dimensionally; and
   (f) displacing said member along the so determined path.

2. The process defined in claim 1 wherein said member is displaceable by three motor means adapted to move said member in the directions of said three coordinates, respectively, further comprising the steps of converting numerical values determining said path into drive signals and energizing said motor means with said drive signals to displace said member along said path.

3. The process defined in claim 1, further comprising the steps of storing on a memory medium numerical values determining said path, and subsequently reproducing said numerical values from said memory medium, and displacing said member in accordance with the reproduced numerical values.

4. The process defined in claim 3 wherein said member is displaceable by three motor means adapted to move said member in the directions of said three coordinates, respectively, further comprising the steps of converting said reproduced numerical values into drive signals and energizing said motor means with said drive signals to displace said member along said path.

5. A computerized numerical control process for displacing a member over a predetermined intricate surface in a predetermined three-dimensional coordinate system, said process comprising the steps of:
   (a) manually dividing said intricate surface into a plurality of elementary characteristic regions each of which is individually definable as one of preselected different geometrical categories among curves of first order, curves of second order, surfaces of first order for an intricate surface so divisible, and surfaces of second order for an intricate surface so divisible and is expressable by an equation specific to each such region;
   (b) establishing a general equation for each of said preselected geometrical categories and storing the established general equation in memory means for a computer;
   (c) inputting into said computer data required to adapt each of said stored general equations to a corresponding one of said characteristic regions in said predetermined three-dimensional coordinate system, thereby reducing it to said specific equation;
   (d) establishing a sequence of incremental two-dimensional positions in said three-dimensional coordinate system which positions are defined by predetermined first and second coordinates thereof;
   (e) successively inputting into said computer the coordinates of said sequentially incremental two-dimensional positions to compute, for each incremental position over said surface, the value of a third coordinate in said coordinate system from said specific equations and said inputted first and second coordinates, thereby determining said surface three-dimensionally; and
   (f) displacing said member along a path over the so-determined surface.

6. The process defined in claim 5 wherein said member is displaceable by three motor means adapted to move said member in the directions of said three coordinates, respectively, further comprising the steps of converting numerical values determining said surface into drive signals and energizing said motor means with said drive signals to displace said member over said surface.

7. The process defined in claim 5, further comprising the steps of storing on a memory medium numerical values determining said surface, and subsequently reproducing said numerical values from said memory medium, and displacing said member in accordance with the reproduced numerical values.

8. The process defined in claim 7 wherein said member is displaceable by three motor means adapted to move said member in the directions of said three coordinates, respectively, further comprising the steps of converting said reproduced numerical values into drive signals and energizing said motor means with said drive signals to displace said member over said surface.

* * * * *